No. 695,328. Patented Mar. 11, 1902.
C. H. McBROOM.
ANIMAL POKE.
(Application filed May 25, 1901.)
(No Model.)
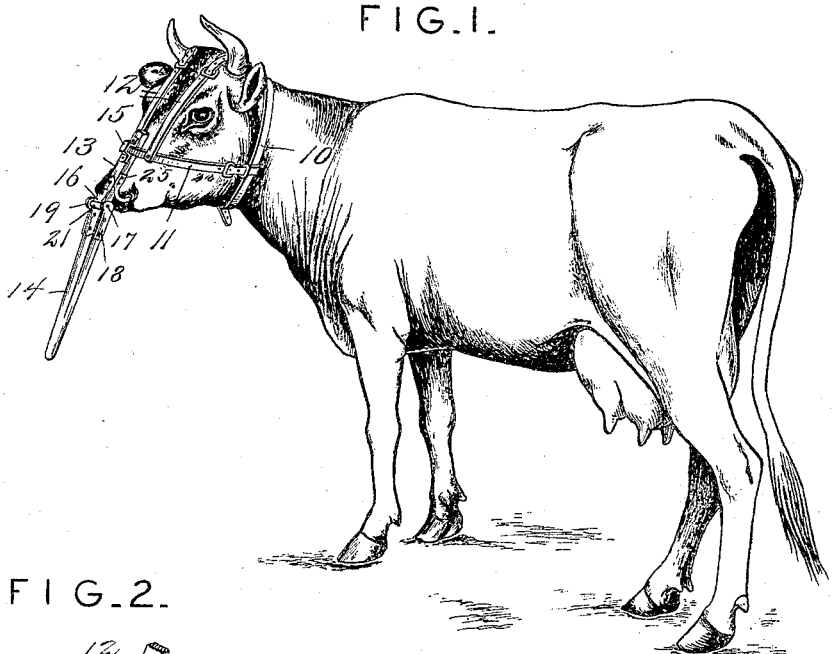
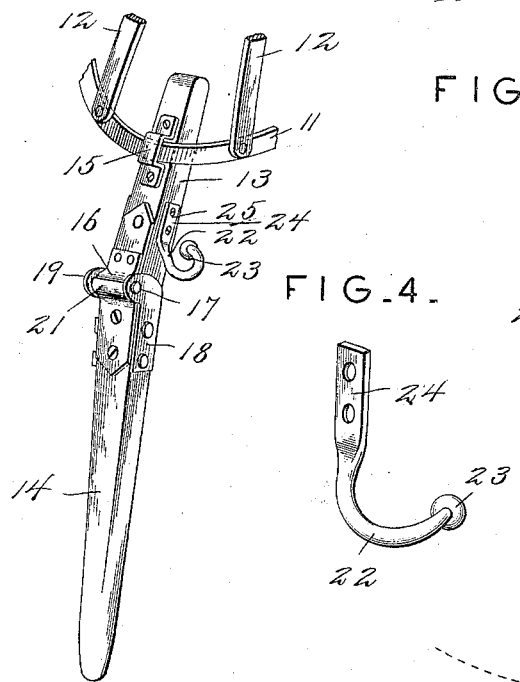
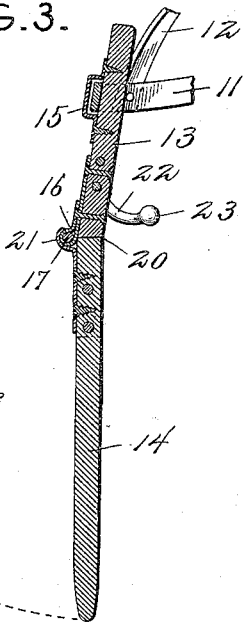
Witnesses
Harry L. Ames
Geo. Ackman
Inventor
Charles H. McBroom
By Victor J. Evans
Attorney
THE NORRIS PETERS CO., PHOTO-LITHO., WASHINGTON, D. C.

UNITED STATES PATENT OFFICE.

CHARLES H. McBROOM, OF CORTICELLI, MISSOURI.

ANIMAL-POKE.

SPECIFICATION forming part of Letters Patent No. 695,328, dated March 11, 1902.

Application filed May 25, 1901. Serial No. 61,917. (No model.)

*To all whom it may concern:*

Be it known that I, CHARLES H. MCBROOM, a citizen of the United States, residing at Corticelli, in the county of Moniteau and State of Missouri, have invented new and useful Improvements in Animal-Pokes, of which the following is a specification.

This invention relates to animal-pokes; and the object in view is to provide, in connection with a supporting-bridle for carrying the weight of the poke proper, a poke consisting of two members, one of which is stationary and supported directly by the bridle and the other member of the poke pivotally connected therewith and adapted to swing in one direction only and being provided with means for limiting its swinging movement. The stationary member of the poke is provided with oppositely-located nostril-hooks adapted to enter the nostrils of the animal and to exert a pressure upon the animal's nose in case the animal should attempt to knock down a fence or other obstruction. Other objects and advantages of the invention will appear in the course of the ensuing description.

The invention consists in an animal-poke embodying certain novel features and details of construction and arrangement of parts, as hereinafter fully described, illustrated, and claimed.

In the accompanying drawings, Figure 1 is a perspective view of the animal-poke complete applied to an animal. Fig. 2 is an enlarged perspective view of the poke, showing a portion of the supporting-bridle. Fig. 3 is a longitudinal section through the same. Fig. 4 is a detail perspective view of one of the nostril-hooks.

Like numerals of reference denote like parts in all figures of the drawings.

In order to support the animal-poke upon the head of the animal to which the poke is to be applied, I employ a bridle, which comprises, essentially, a neck-strap 10, a nose-strap 11, having its opposite ends suitably connected to the neck-strap, and twin head-straps 12, which have their lower ends permanently connected to the nose-strap and their opposite ends adjustably connected to the neck-strap, as clearly illustrated in Fig. 1.

The poke proper comprises a stationary member 13 and a hinged or pivoted member 14, the stationary member being connected to the nose-strap 11 by means of a keeper-loop 15, which is preferably mounted on the front side of the member 13, so that the nose-strap when tightened will hold the member 13 snugly against the nose of the animal, as illustrated in Fig. 1. The stationary member 13 is provided at its lower end and upon its front side with a knuckle or sleeve 16, which receives a pin 17, forming the pivotal connection between the two poke members, the hinged poke member 14 being provided on opposite sides with plates 18, having laterally-projecting ears 19, formed with openings to receive the pivot-pin 17. When the hinged member 14 hangs in its pendent position, as shown in Figs. 1, 2, and 3, the meeting ends of the two members of the poke form abutting shoulders, as shown at 20, and serve to prevent the hinged poke member from swinging rearward beneath the head of the animal. The hinged connection, however, leaves the member 14 free to swing forward, so as to allow the animal to graze with freedom. The forward-swinging movement of the hinged member 14 is limited by means of a stop 21 in the form of a plate secured to the upper end and front side of the member 14 and having its upper portion curved to embrace the knuckle or sleeve 16, so that when the member 14 is swung upward a certain distance the edge of the stop will strike against the plate or strip of metal of which the knuckle 16 is formed, and thereby prevent the animal from swinging the hinged member of the poke far enough upward to cause said member to lie against the forehead.

The stationary poke member 13 has attached to its opposite sides nostril-hooks 22, provided with spherical enlargements 23 at their extremities, and having their shanks 24 flattened and provided with openings to receive suitable fasteners 25 for securing the hooks permanently to the stationary poke member 13. In applying the poke to the animal the hooks 22 are inserted in the nostrils and the bridle afterward adjusted to the head of the animal.

From the foregoing description it will be seen that the animal-poke is supported entirely by the bridle and the animal relieved of the weight thereof. Should the animal, however, endeavor to knock down a fence, the backward pressure on the hinged member of the poke will cause the nostril-hooks to distend the nostrils of the animal and inflict sufficient pain to cause the animal to desist. The poke upon coming in contact with the ground is adapted to swing upward and will not, therefore, interfere with the freedom of the animal in grazing.

Having thus fully described my invention, what I claim as new, and desire to secure by Letters Patent, is—

In an animal-poke, the combination with a bridle having means whereby it may be adjusted to the animal's head; of a poke proper comprising a stationary member adapted to extend upward from the animal's nose, means thereon for securing the bridle thereto, rigid inwardly-extending nostril-engaging hooks secured at opposite sides of said member, a knob at the free end of each hook, a sleeve at one end of the stationary member, a hinged member, ears at one end thereof, a pin engaging the ears and sleeve, the adjacent ends of the members being adapted to abut and limit the movement of the hinged member in one direction, and a stop upon the hinged member extending over the sleeve and adapted to limit the movement of said member in the opposite direction.

In testimony whereof I affix my signature in presence of two witnesses.

CHARLES H. McBROOM.

Witnesses:
 N. C. RICE,
 F. A. RICE.